F. E. PAYNE.
DISPENSING APPARATUS.
APPLICATION FILED DEC. 2, 1919.
1,350,112. Patented Aug. 17, 1920.
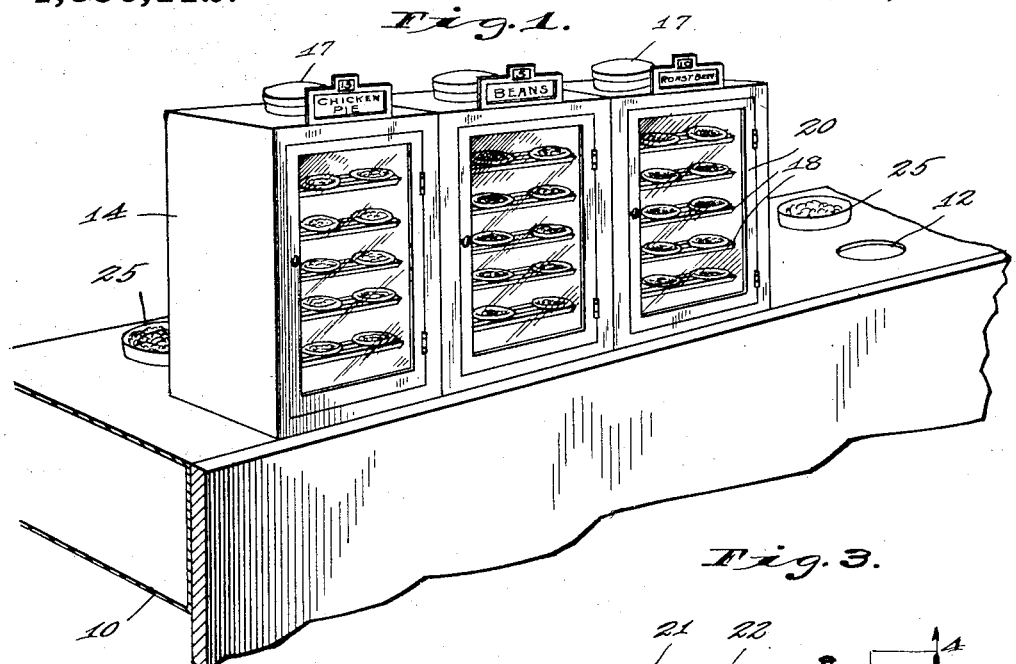
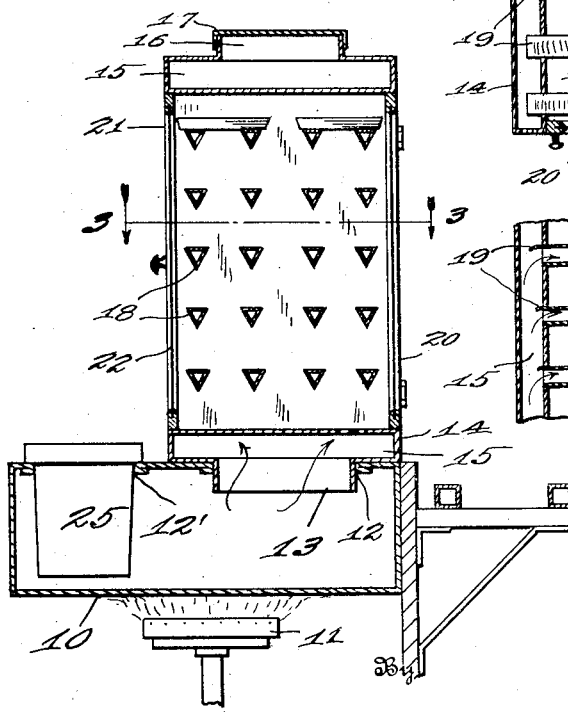
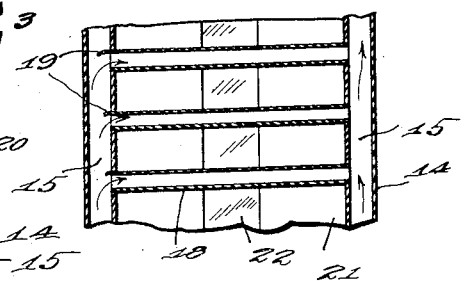
Inventor
Floyd E. Payne,
Hood & Seeley
Attorneys

UNITED STATES PATENT OFFICE.

FLOYD E. PAYNE, OF INDIANAPOLIS, INDIANA.

DISPENSING APPARATUS.

1,350,112.   Specification of Letters Patent.   Patented Aug. 17, 1920.

Application filed December 2, 1919. Serial No. 341,949.

*To all whom it may concern:*

Be it known that I, FLOYD E. PAYNE, a citizen of the United States, residing at Indianapolis, in the county of Marion and State of Indiana, have invented a new and useful Dispensing Apparatus, of which the following is a specification.

The object of my invention is to produce an apparatus to facilitate the dispensing of food in restaurants, cafeterias, etc., the apparatus being of such character that desired portions of hot or cold foods may be prepared in advance of delivery from closely adjacent supplies, both the supply and the prepared portions being kept either hot or cold, pending delivery.

The accompanying drawings illustrate my invention. Figure 1 is a fragmentary perspective of an apparatus embodying my invention; Fig. 2 a central vertical section through one of the sections; Fig. 3 a fragmentary plan on line 3—3 of Fig. 2; and Fig. 4 a fragmentary section on line 4—4 of Fig. 3.

In the drawings, 10 indicates a hollow table or bench adapted either to receive water to be heated by a burner 11, or otherwise, or to contain a cooling liquid such as brine, ice water, etc. The top of table 10 is perforated, with several pairs of perforations 12 and 12', the perforations 12 being arranged parallel with and adjacent the delivery or customer-side of the table, while the perforations 12' are arranged parallel with and adjacent the service-side of the table. Mounted in each perforation 12 is the hollow neck 13 of a delivery cabinet 14 of any desired size, said compartment comprising hollow bottom, top and side walls forming circulation chambers 15 which are in communication with the hollow sleeve 13. Giving access to the interior of the top wall, is a passage 16 covered by a cover 17. Extending from side wall to side wall, are hollow bars 18 arranged in horizontal series to form shelves or supports for dishes containing portions of edibles to be served. These bars 18 are preferably triangular in cross section, as shown in Fig. 2, and form communicating passages between the chambers 15 of the side walls, the upper wall of each bar being preferably extended, as indicated at 19, into one of the vertical chambers 15, and these extensions gradually increasing in length from the lower series of bars upwardly.

Giving access to the interior of the cabinet from the customer's side of the table, is a swinging door 20 preferably transparent throughout the major portion of its area. Giving access to the interior of the cabinet from the service side of the table, is a swinging door 21, having a vertically extended side panel 22. Both of the doors 20 and 21 are preferably provided with spring hinges of ordinary type, so that they will remain normally closed. The cabinets 14 are conveniently formed as individual units, so dimensioned as to set close together when placed in position over the perforations 12. Suitable containers 25, containing the viands to be dispensed through the immediately adjacent cabinet 14 are placed in the perforations 12'.

It will be apparent from the above that the attendant back of the cabinets 14 may readily keep track of the contents of the several cabinets, and may readily prepare individual portions from the appropriate container 25, and place such prepared portions in the appropriate cabinet 14. The customers passing in front of the cabinets 14 may help themselves to the prepared portions which they may desire.

If the portions are to be dispensed hot, the interior of table 10 will be provided with water which will be heated and steam from which will rise through the collars 13 and through the hollow walls 15, circulating through the shelf bars 18, thus keeping the contents of the cabinets properly heated. At the same time, the viands in containers 25 will be kept similarly heated. In case the viands are to be kept cold, ice or a cooling medium may be maintained in the interior of chamber 10 and the tops of the various cabinets may be also filled with ice through the opening 16.

I claim as my invention:

1. A food-dispensing device, comprising a hollow table having two series of perforations, one for the reception of supply vessels, and a series of dispensing cabinets having hollow walls placed in communication with the other series of openings of the table, said dispensing cabinets having independent front and rear doors giving access to the interior thereof either from the customer's side or the service side.

2. A dispensing cabinet having hollow walls capable of being placed in communication with the interior of a supporting table, said cabinet having doors in its front and rear faces, and having an interior support upon which dispensable viands may be placed, said support comprising hollow members extending transversely to form communicating passages between the vertical hollow walls.

3. A dispensing cabinet having hollow walls capable of being placed in communication with the interior of a supporting table, said cabinet having doors in its front and rear faces, and having an interior support upon which dispensable viands may be placed.

In witness whereof, I have hereunto set my hand at Indianapolis, Indiana, this 28th day of November, A. D. one thousand nine hundred and nineteen.

FLOYD E. PAYNE.